United States Patent [19]
Wheeler et al.

[11] Patent Number: 5,884,050
[45] Date of Patent: Mar. 16, 1999

[54] MECHANISM FOR HIGH BANDWIDTH DMA TRANSFERS IN A PCI ENVIRONMENT

[75] Inventors: William R. Wheeler, Southboro; Matthew James Adiletta, Worcester; Samuel Ho, Marlboro; Debra Bernstein, Sudbury; Gilbert M. Wolrich, Framingham, all of Mass.

[73] Assignee: Digital Equipment Corporation, Maynard, Mass.

[21] Appl. No.: 668,200

[22] Filed: Jun. 21, 1996

[51] Int. Cl.[6] .................................................... G06F 13/00
[52] U.S. Cl. .......................... 395/287; 395/281; 395/282; 395/842; 395/872
[58] Field of Search ...................... 395/287, 872, 395/842, 425, 848, 849, 846, 281, 500, 282; 364/200

[56] References Cited

U.S. PATENT DOCUMENTS

| | | | |
|---|---|---|---|
| 5,386,532 | 1/1995 | Sodos | 395/425 |
| 5,530,902 | 6/1996 | McRoberts et al. | 395/848 |
| 5,613,162 | 3/1997 | Kabenjian | 395/842 |
| 5,659,798 | 8/1997 | Blumrich et al. | 395/846 |
| 5,682,483 | 10/1997 | Wu et al. | 395/281 |
| 5,784,592 | 7/1998 | Gulick et al. | 395/500 |

*Primary Examiner*—Ayaz R. Sheikh
*Assistant Examiner*—Eric S. Thlang

[57] ABSTRACT

A method and apparatus for maximizing the performance of DMA transfers over a PCI™ bus are provided which includes a Per-Channel Retry count, Double Buffer Management, Wait Enable functionality, Back Up register functionality, Gather/Scatter mapping, a method for minimization of PIO writes, Read Semaphore functionality, a method for servicing of DMA transfers during FMU latency periods, Valid bit functionality, high and low water thresholds, and re-usable page tables.

7 Claims, 11 Drawing Sheets

MECHANISM FOR HIGH BANDWIDTH DMA TRANSFERS IN A PCI ENVIRONMENT

BACKGROUND OF THE INVENTION

This invention relates generally to computer systems and more specifically to data transfers within computer systems.

As it is known in the art, in order for components comprising a computer system to use data stored in main memory or in other components, there needs to be a communication channel dedicated to inter-component data communication. Such a communication channel is typically comprised of a data bus having a protocol specifying proper use of the data bus.

One such protocol used in the industry is the Direct Memory Access protocol, referred to as DMA. DMA is a method for allowing a component having DMA capabilities to control the reading and writing of data to or from a target device. DMA is a very efficient data transfer methodology because the central processing unit (CPU) does not need to be directly involved in the transaction. Since the CPU does not need to control DMA data transfers, it is free to perform other computing tasks. Therefore, not only does DMA allow for quick data access, it also increases the system's overall performance by allowing the CPU to concurrently perform other necessary computations.

One implementation of DMA is used as part of the Peripheral Component Interconnect (PCI™) data bus standard. The PCI™ standard is an overall bus architecture standard which governs the physical features of a bus as well as the structure of data transfers using the bus. The specified data bus structure allows each component connected to the bus to become either a bus master device, which controls transactions on the bus, or a target device which is accessed by a bus master device.

To become a bus master, a device asserts a request signal connected to an arbitration unit referred to as the bus arbiter. Using one of a variety of arbitration schemes, the arbiter grants ownership of the PCI™ bus to a bus master device at the appropriate time. Once a device acquires ownership of the bus, it is allowed to initiate a data transfer between itself and a target device, which is typically a shared memory subsystem.

A data transfer, employing the PCI™ standard, is initiated when the bus master device places the address of a desired data element and a command onto the address/data bus and asserts a signal referred to as FRAME. The FRAME signal defines the outer timing boundaries of the transfer, i.e. its assertion and deassertion (along with the IRDY and TRDY signals defined below) indicates the beginning and ending of the data transfer. After or coincident with the bus master asserting the FRAME signal, it further asserts an Initiator Ready signal referred to as IRDY. The assertion of this signal indicates that the bus master device is ready to transfer the first data word.

When the target device decodes the address it asserts signal DEVSEL and, when it is ready to transfer or receive data, asserts a target ready signal referred to as TRDY. Data is only transferred when the TRDY and IRDY signals are concurrently asserted. Alternatively it should be noted that when the signal TRDY is de-asserted, this indicates to the bus master device that the target is not ready to be accessed with the next word of data. When the FRAME signal is de-asserted, the bus master terminates the transfer after attempting one further data phase. To terminate the data transfer, the bus master relinquishes control of the PCI™ bus to allow another device to become bus master and to initiate its own data transfer cycle. Accordingly, a read or write cycle on the PCI™ bus is completely controlled by the bus master device and the target device with no intervention by the central processing unit.

Certain problems can arise when transferring data using a DMA data transfer mechanism over the PCI™ bus. As previously mentioned, a data transfer only occurs when both the TRDY and IRDY signals are asserted. If a target device is busy and cannot support a data transfer, it will not assert the TRDY signal. Alternatively, if a target begins a data block transfer but subsequently is not able to complete the transfer, it will de-assert the TRDY signal and assert the STOP signal having transferred only a portion of the requested data.

When a data block transfer is ended by the target device before completion, the bus master device re-establishes communication with the target device, at a future time, to complete the transfer of the data block. What is typically done in the industry is that the bus master device will immediately begin trying to re-establish data transfer communications with the target device in order to complete the data transfer as quickly as possible. However, immediately retrying a data transfer request can waste PCI cycles if the target device will typically remain busy for a period of time after the data transfer is terminated.

A further problem that arises during DMA data transfers over the PCI™ bus is that of erratic data flow. A typical cause for erratic data flow in bus master and target devices is access time for the device's private memory subsystem. Access to a private memory subsystem is typically lengthened due to refresh cycles which coincide with data access cycles, and due to addressing latency when using dynamic memory elements which incur significant address penalties when an access crosses an address page boundary.

The PCI™ bus protocol provides a maximum data transfer rate of one longword per 30 ns when operating with a 33 Mhz PCI™ bus clock. In order to approach this magnitude of data rate, a bus master and target device combination should be capable of transferring a longword of data to/from the PCI™ bus during every PCI™ clock cycle. If data is not accessible at this rate due to erratic data flow, PCI™ bus bandwidth is wasted which results in a reduction of the overall system performance.

Another problem which impedes the transfer of data over the PCI™ bus is the time required to set up the DMA transfer. A chip having DMA capabilities has control structures which keep track of the data to be transferred in each DMA transfer. These structures require significant chip resources and bus bandwidth to initialize and manage the data transfer which detracts from the available time that the chip has to perform the data transfer. Such time delays reduce the DMA data transfer performance on the PCI™ bus.

Therefore a data transfer methodology is required which solves these problems and hence increases the data bandwidth of the data bus.

SUMMARY OF THE INVENTION

In accordance with the present invention, a method for transferring data over a data bus includes the steps of a first device acquiring ownership of a data bus, then initiating data transfers between itself and a second device, altering the length of each of the data transfers in response to a characteristic of the data transfer. The steps of the method further include storing time representation values wherein each value relates to a characteristic of the data transfer, and accessing these time representation values upon interruption of one data transfer for determining a duration of time to wait before the first device requests resumption of the interrupted data transfer.

This method has the advantage of preventing the first device from requesting resumption of interrupted data transfers until a future time when the second device is more likely to resume the transfer. Therefore data bus usage is optimized.

In accordance with a further aspect of the present invention, a co-processor device is specified having the capability to transfer data over a data bus, and comprising a first circuit portion having the ability to acquire ownership of the data bus and to control data transfers over the data bus. The co-processor device also has a second circuit portion for controlling a memory system and for transferring data from the memory system to the first circuit portion to be transferred over the data bus. Further, a double buffer is included in the co-processor for connecting the first circuit portion and the second circuit portion.

The double buffer configuration enables continuous transfer of data between the first circuit portion and the second circuit portion, and hence increases the amount of data that the co-processor can transfer during a given data transfer.

Another aspect of the present invention includes a method for transferring data over a data bus. The method comprises the steps of a first device acquiring ownership of the data bus and initiating a plurality of data transfers between itself and a second device. The length of each data transfer being altered in response to a characteristic of the data transfer. The steps further include changing the state of a memory location to indicate to the first device to suspend the data transfer for a specified period of time when the data transfer is interrupted due to insufficient data.

A further aspect of the present invention is a method for transferring data elements over a data bus which comprises the steps of a first device acquiring ownership of the data bus and initiating data transfers between itself and a second device. The length of the data transfers is altered in response to a characteristic of the transfer. The data elements are stored in a first storage location and a copy is stored in a second storage location while each of the data elements are being transferred over the data bus. The method comprises a final step of reallocating the first storage location when the second to last data element is being transferred over the data bus.

This method has the advantage of allowing the first storage location to be immediately re-used after the last data element is read out since the second storage location holds a copy of the last data item. This method contributes to the optimization of data bus usage.

A further aspect of the invention includes an apparatus for controlling a first data transfer over a data bus. The apparatus comprises a first device which acquires ownership of the data bus and initiates a first data transfer between the first device and a second device. The first device comprises a first plurality of storage locations which each comprise a first software pointer to one of a second plurality of storage locations for storing data to be transferred to the second device. The first device further comprises a third plurality of storage locations which each correspond to a class of data and each comprise a second software pointer for loading data into one of the first plurality of storage locations. Each of the third plurality of storage locations further comprise a third software pointer for reading data out of one of the first plurality of storage locations. The third storage location further comprises a fourth software pointer for pointing to a fourth plurality of storage locations, each of which comprises a fifth software pointer to one of a fifth plurality of storage locations. The first device further comprises a sixth plurality of storage locations wherein each storage location corresponds to a class of data operation and comprises a software pointer to one of a seventh plurality of storage locations. Each of the seventh plurality of storage locations comprises a pointer to one of the third plurality of storage locations.

This apparatus supports the transfer of different types of data using a common memory controller microcode flow which optimizes bus bandwidth, or rather minimizes the time it takes to transfer a specified amount of data over a data bus.

BRIEF DESCRIPTION OF THE DRAWINGS

The foregoing features of this invention, as well as the invention itself, may be more fully understood from the following detailed description when read in conjunction with the accompanying drawings, in which.

DESCRIPTION OF A PREFERRED EMBODIMENT

Figure 1:
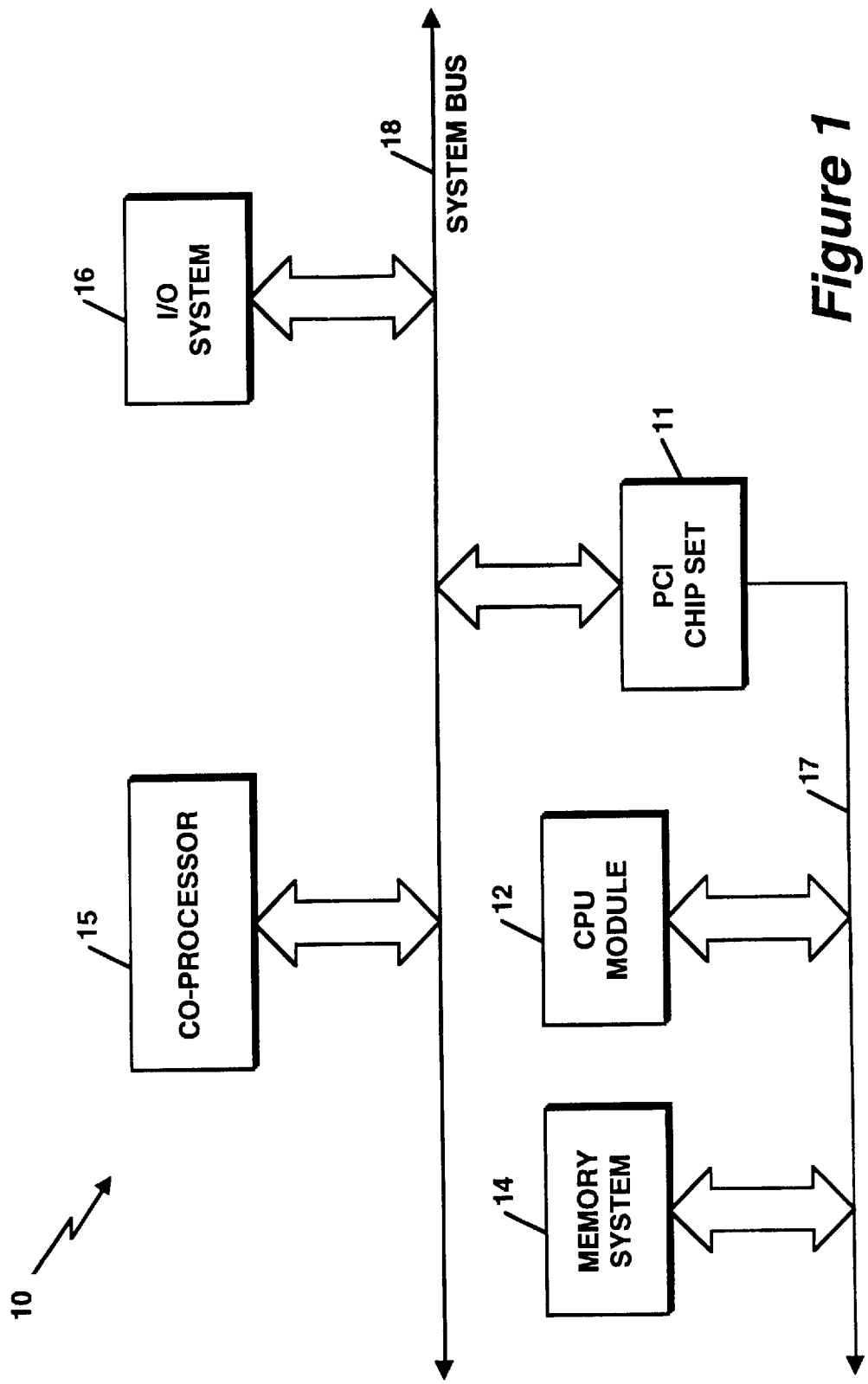
FIG. 1 depicts a block diagram of a computer system having a co-processor integrated circuit in which the present invention may be applied.

Referring to FIG. 1, a computer system 10 is shown to include a central processing unit (CPU) 12, a memory system 14, and a PCI™ chip set 11 interconnected by a private bus 17. Further, a co-processor integrated circuit 15, and an input/output (I/O) system 16 is shown interconnected with PCI™ chip set 11 by a system bus 18. The main purpose of Co-processor 15 is to perform compression (coding), decompression (decoding), and filtering of video data which is stored in memory system 14.

Video and audio data is transferred between memory system 14 and co-processor 15 via private bus 17, PCI™ chip set 11, and system bus 18. System bus 18 follows the Peripheral Component Interconnect (PCI™) standard which is capable of transferring data up to 133 Mbytes/second, although it is understood that the present invention could be modified for use with other bus standards and other system configurations by one of ordinary skill in the art.

Figure 2:
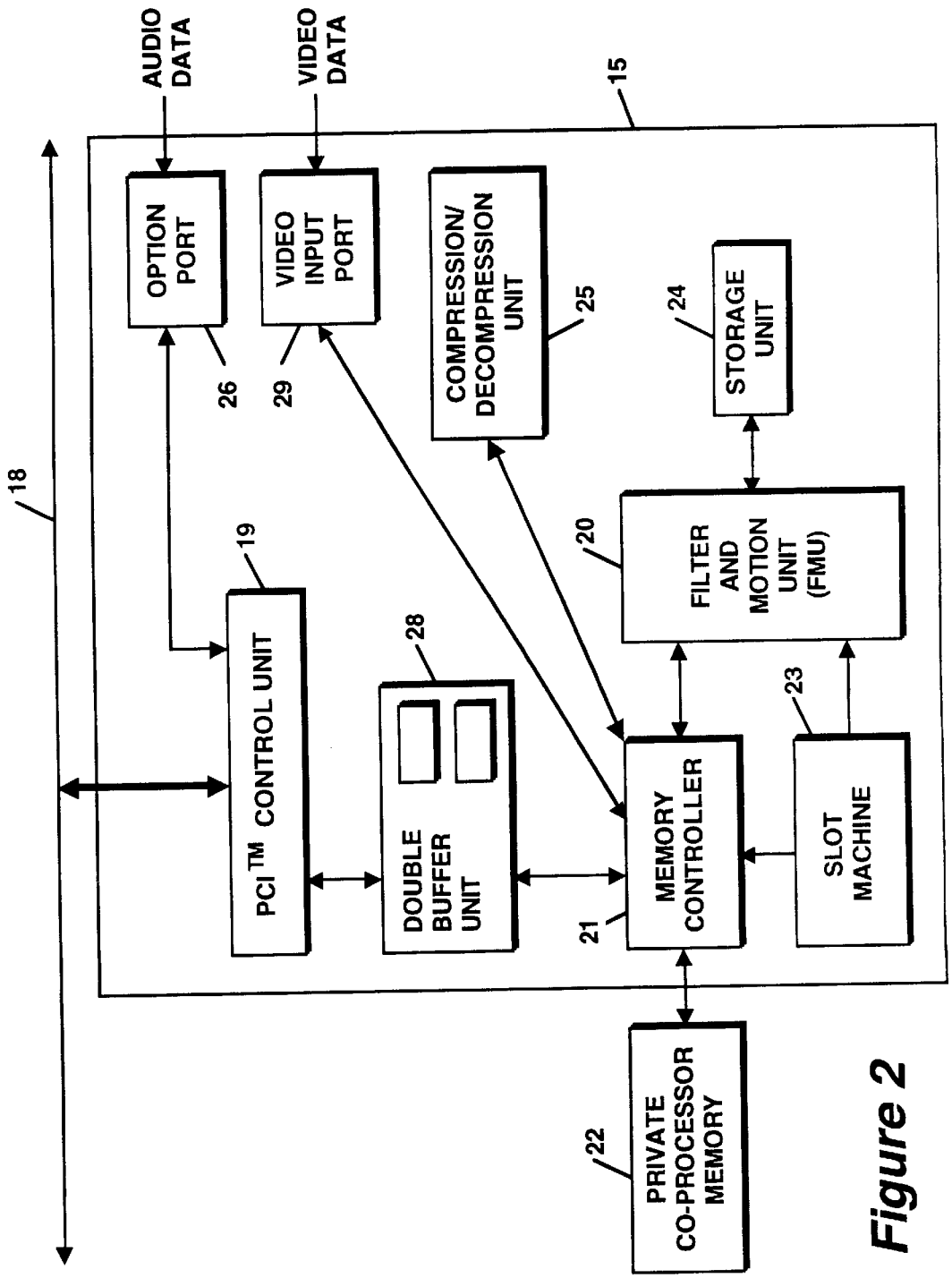
FIG. 2 depicts a block diagram of the co-processor of FIG. 1.

Referring to FIG. 2, a block diagram of co-processor 15 is shown attached to system bus 18. Co-processor 15 comprises a PCI™ control unit 19 for communication with other connected PCI™ devices, a Filter and Motion Unit 20 for performing filtering of video data, as well as motion estimation and motion compensation, a slot machine 23 for coordinating the activities of the Filter and Motion Unit 20 and the memory controller 21, and a compression/decompression unit 25 for performing encoding and decoding of video data. The Filter and Motion Unit 20 is attached to a storage unit 24 which acts as a temporary buffer for input data and for calculation results.

The co-processor 15 includes a memory controller unit 21 for controlling access to the attached private co-processor memory 22. Private co-processor memory 22 stores video data to be compressed or decompressed and also stores other intermediate data types which are used in the process of compression and decompression. Further, co-processor 15 includes a double buffer unit 28 between memory controller 21 and PCI™ control unit 19 for providing smooth data flow between private memory 22 and the PCI™ bus as will be described below.

Since several types of data are transferred to/from system memory 14 using the attached system bus 18, the co-processor device is highly sensitive to the level of CPU activity on the system. In computer system 10, the Central Processing Unit 12 is a shared resource and therefore is required to perform many operations using the system bus. Therefore co-processor 15 has the difficult task of executing real time operations using the same bus as the CPU.

Co-processor 15 executes real time operations using system bus 18 because of the nature of its video data operations. Co-processor 15 has an option port 26 for receiving audio data, and a video input port 29 over which data is transferred at 30 frames per second. Only the necessary reference video frames are stored in private co-processor memory 22 in order to limit its size. As these frames are being operated on, co-processor 15 needs to access system memory at a sufficiently fast rate to insure that the entire operation completes in real time.

Figure 3:
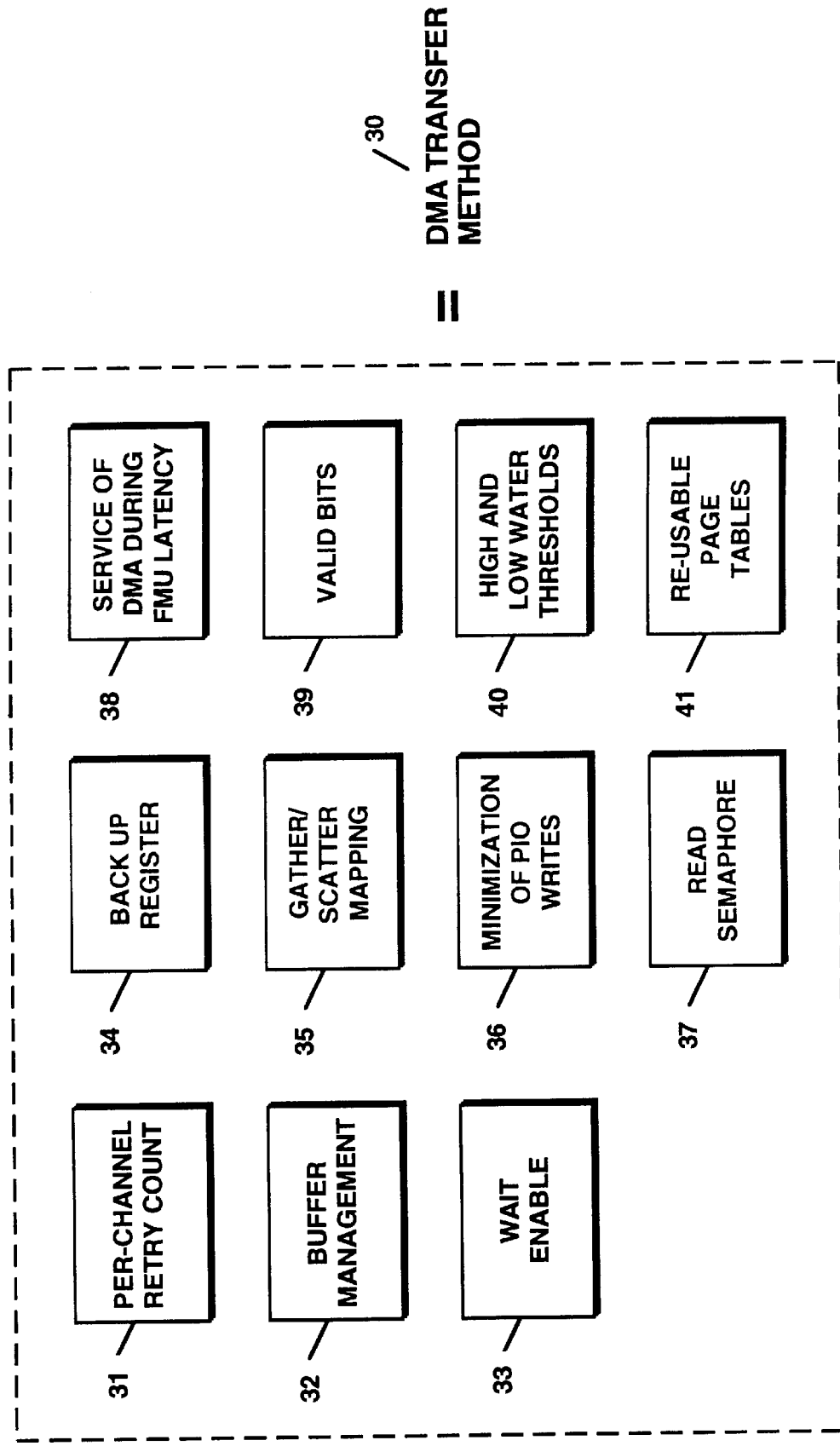
FIG. 3 depicts the methods used by the co-processor of FIG. 1 to optimize DMA data transfers.

Referring now to FIG. 3, the methods of a Per-Channel Retry count 31, Buffer Management 32, Wait Enable 33, Back Up register 34, Gather/Scatter mapping 35, minimization of PIO writes 36, read semaphore 37, Service of DMA Transfers During FMU Latency 38, Valid bits 39, high and low water thresholds 40, and re-usable page tables 41 are shown to comprise the DMA data transfer functionality 30 of co-processor 15. Co-processor 15 uses these methods, independently and collectively, to optimize its bus bandwidth, or rather to minimize the time it takes to transfer a specified amount of data over system bus 18, and maximize its real time operation performance.

I. Per-Channel Retry Count

One method used here to optimize data bandwidth involves a method for determining the number of clock pulses that the PCI™ unit will wait before retrying an interrupted data transfer. The PCI™ bus protocol version 2.1 specifies that once a data transfer operation is initiated, the destination or target device can signal its inability to complete a data block transfer by asserting a bus control signal referred to as STOP. During a read operation the target device is required to terminate the transaction if it cannot drive data onto the PCI™ bus within 8 PCI™ clock cycles. In order to complete the interrupted transfer, the initiating device and target device are required to resume the data transaction at a future time. The initiating device, also referred to as the PCI™ master, makes the decision whether to retry the transfer immediately or postpone it until there is a higher probability that the target device is no longer busy, i.e. when the condition which terminated the prior data transfer has been resolved.

If the transfer request is immediately retried, there is a high probability that the target device is still busy or is still handling the interrupting condition. Therefore, a strategy of immediately retrying the transfer request may waste PCI™ bandwidth if the target device remains busy.

A better solution presented here is that the master device should wait a period of time before retrying the transaction so as to make efficient use of the PCI™ bus. The amount of time before retries, and hence also the performance of the PCI™ bus, is strongly dependent on the system in which it is implemented. In order to make optimum use of this system dependence, co-processor 15 implements parameterized switches to enable it to tune to any system in which it is implemented. Thus, by tuning the device to the system, optimum PCI™ performance can be achieved.

In the co-processor 15, one method that may be used to provide parameterized switches is through a Per-Channel Retry Count. The Per-Channel Retry count is part of the co-processor's ability to tune itself to specific system configurations. Co-processor 15 uses a plurality of data types, each represented by a separate data channel. For example, several of the channel types that are implemented by co-processor 15 are raw pixel data, compressed pixel data, motion estimation statistics data, motion compensation data, run length encoded data (RLE), audio read data, and audio write data. Based on the particular channel, and therefore on the particular data type, the device driver for co-processor 15 sets the number of cycles to wait before a retry request operation is to be performed after a data transfer is interrupted. The device driver specifies the Per-Channel Retry count when it initializes the data channels with DMA control information, either at the time the chip is first initialized for operation, or before the execution of each transfer.

Retry counts can be tuned on a per-channel basis to significantly improve DMA transfer performance for certain data types on the PCI™ bus. The Per-Channel Retry count is controlled by the co-processor's microcode which knows which data is to be transferred via DMA and what channel of DMA is to be used. Therefore when initiating a DMA transfer, the microcode transfers the Per-Channel Retry count associated with that channel to the PCI™ controller 19 which will execute the transaction. Data channels which have lower latency requirements, for example the motion compensation data channel, have a shorter Per-Channel Retry count period associated with them than is associated with less critical data channels. Less critical data channels can handle longer latencies and do not significantly affect other processes if the transfer duration is increased.

Figure 4:
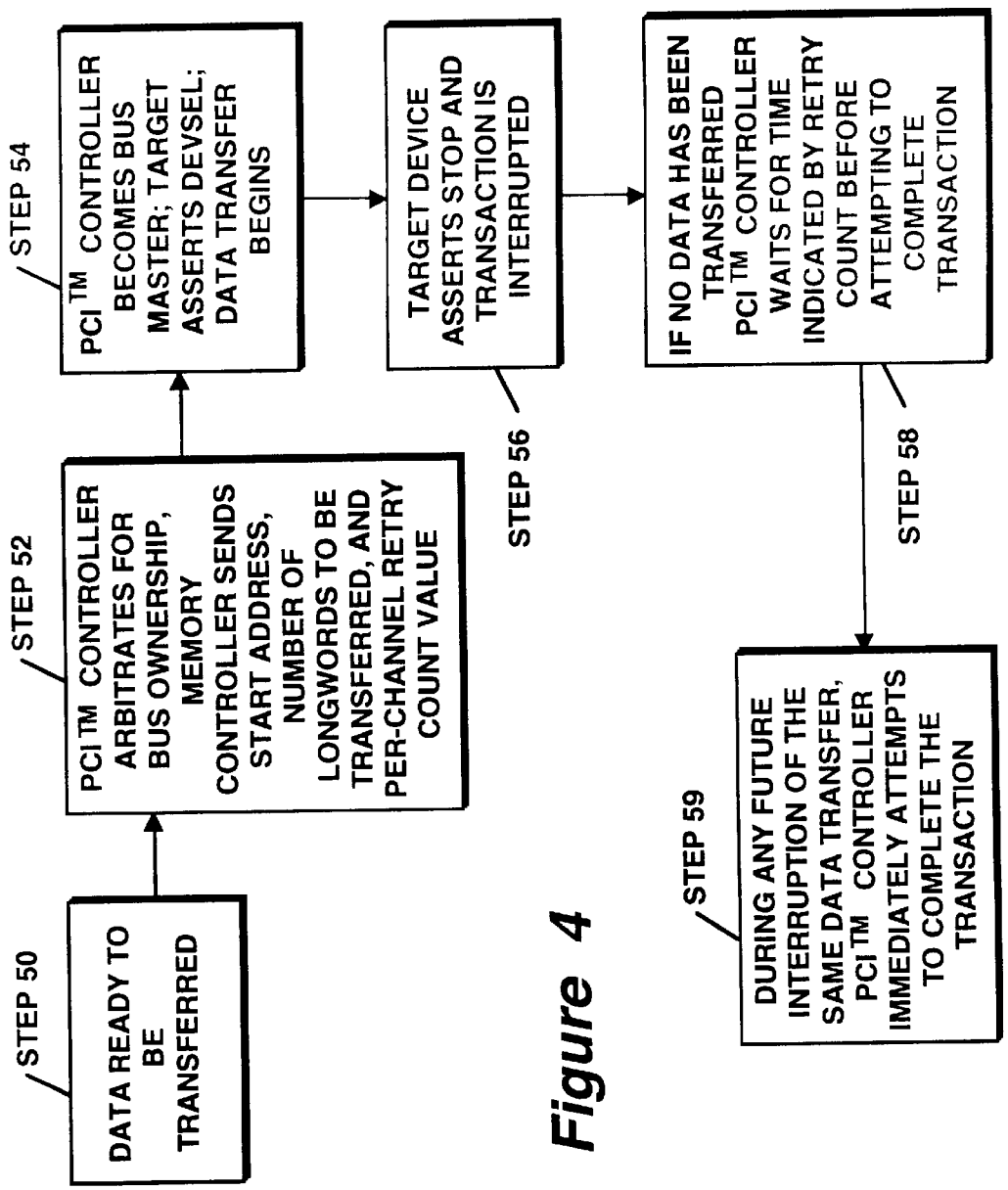
FIG. 4 is a flow chart diagram depicting the steps of a Per-Channel Retry count operation by co-processor 15 of FIG. 2.

Referring now to FIG. 4, a flow diagram illustrating use of the Per-Channel Retry count is shown. A DMA transfer using the Per-Channel Retry count begins at step 50 when memory controller 21 has data which is ready to be transferred. At step 52 memory controller 21 sends a command to the PCI™ controller 19, over the internal command bus which connects the two units, to arbitrate for access to the PCI™ bus for the purpose of beginning a DMA operation.

At the same time, the Memory controller 21 sends a 32 bit PCI™ address to the PCI controller 19 which indicates the address at which the DMA transfer should begin. Further the memory controller 21 sends a count value, which indicates the number of longwords to be transferred, and transfer qualifying information including the Per-Channel Retry count value, to the PCI™ controller 19. At step 54 PCI™ controller 19 acquires ownership of the bus, the target device signals acknowledgment of the address and that it is ready for the transfer of data, and the DMA operation begins. If the transfer is disconnected such that signal STOP is asserted before any data is transferred (step 56), PCI™ controller 19 will wait a period of time equivalent to the number of PCI™ clock pulses contained in the Per-Channel Retry count value before attempting to complete the transaction (step 58). Otherwise, if any portion of the data block has been transferred before the target asserts signal STOP, PCI™ controller 19 immediately attempts to complete the transaction (step 59).

In an alternate embodiment of the Per-Channel Retry count, which could be used by co-processor 15, the PCI™ controller 19 waits for a period of time equivalent to the number of PCI™ clock pulses contained in the Per-Channel Retry count value before attempting to complete any interrupted data transfer. When this embodiment is used, retry of a transfer is delayed regardless of whether any portion of the data block has previously been transferred.

A tuning capability such as the Per-Channel Retry count is unique among co-processor devices because most are designed to immediately retry the disconnected operation.

II. Buffer Management

A second technique used to optimize data bandwidth is through improved buffer management. As described with reference to FIG. 2, co-processor 15 is comprised of a PCI™ controller unit 19 and a memory controller unit 21 which are closely coupled and work in cooperation with each other to maximize device efficiency. A double buffer unit 28 couples the two devices and is comprised of buffers 26 and 27.

Each of these buffers, 26 and 27, stores eight longwords of data sent from the memory controller 21 for transfer over the PCI™ bus using DMA. The buffers are further capable of buffering data received from the PCI™ bus 18 to be passed to memory controller 21. The double buffer configuration implements a FIFO between two different clocking domains using a single ported memory cell which enables continuous transfer of data between the PCI™ bus 18 and the private co-processor memory 22, and hence increases the amount of data that the PCI™ controller can transfer during a given DMA data transfer.

Figure 5:
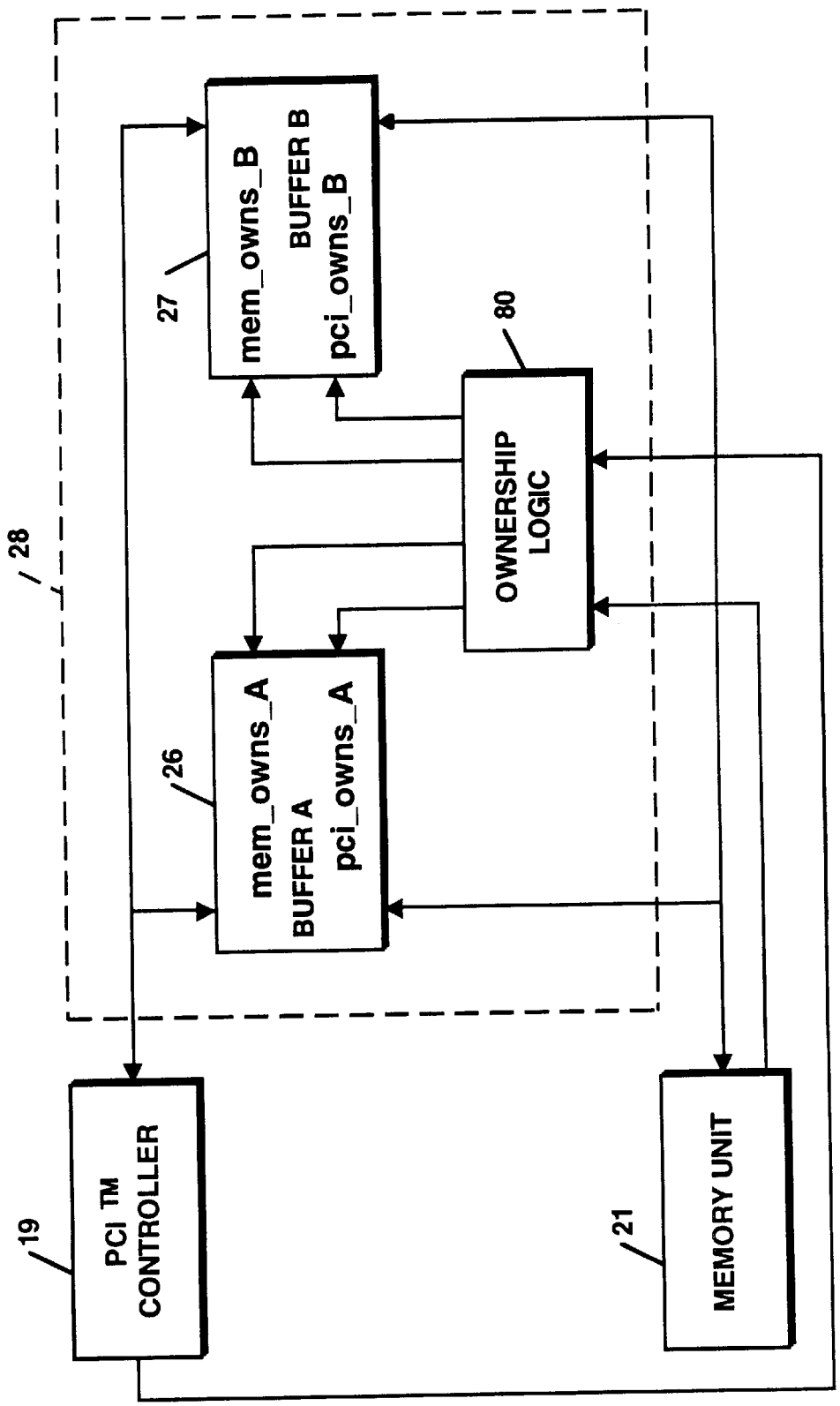
FIG. 5 depicts a block diagram of a circuit used to determine ownership of the double buffers by the memory controller and PCI™ controller of FIG. 2.

Referring now to FIG. 5, a block diagram is shown depicting the configuration of the double buffer unit 28. Ownership logic 80 is also shown receiving inputs from the PCI™ Controller 19 and the Memory Controller 21 that are used to determine the ownership of each buffer, 26 and 27.

A first aspect of the double buffer unit 28 operation is that a first buffer 26 is written to while a second buffer 27 is being read from, thereby eliminating the latency caused by having only a single buffer. In the case of DMA reads from memory system 14, the memory controller 21 reads data out of a first buffer 26 while the PCI™ unit 19 writes data into the second buffer 27. It should be noted that buffers 26 and 27 are interchangeable and therefore either buffer could be owned by the PCI™ controller 19 or the memory controller 21.

In the DMA write case where co-processor 15 is writing data to the memory system 14, ownership logic 80 determines that memory controller 21 should acquire ownership of a first data buffer 26 for data writes at the same time that the PCI™ controller 19 acquires ownership of a second buffer 27 for reads. When either the memory controller is finished writing to the first data buffer 26, or when the PCI™ controller is finished transferring the contents of the second buffer 27 to the PCI™ bus, ownership logic 80 specifies that ownership of that buffer is to be exchanged. When ownership of both buffers has been exchanged, the PCI™ controller thereafter transfers data out of the first buffer 26 and the memory controller writes data into the second buffer 27.

It should be noted that because buffer ownership may not always be synchronously exchanged, it is possible for both buffers to be owned by either memory controller 21 or by PCI™ controller 19. For example, in another aspect of the double buffer unit operation, ownership of both buffers is given to PCI™ controller 19 at the beginning of a DMA read operation since that is where the data is input for purposes of the data transfer to memory controller 21. When one buffer is filled with read data, ownership of that buffer is exchanged and memory controller 21 can empty it while the other buffer is being filled. Likewise, at the beginning of a DMA write operation, ownership of both buffers is given to memory controller 21 since that is where all the write data originates, for purposes of the data transfer to PCI™ controller 19.

Figure 6:
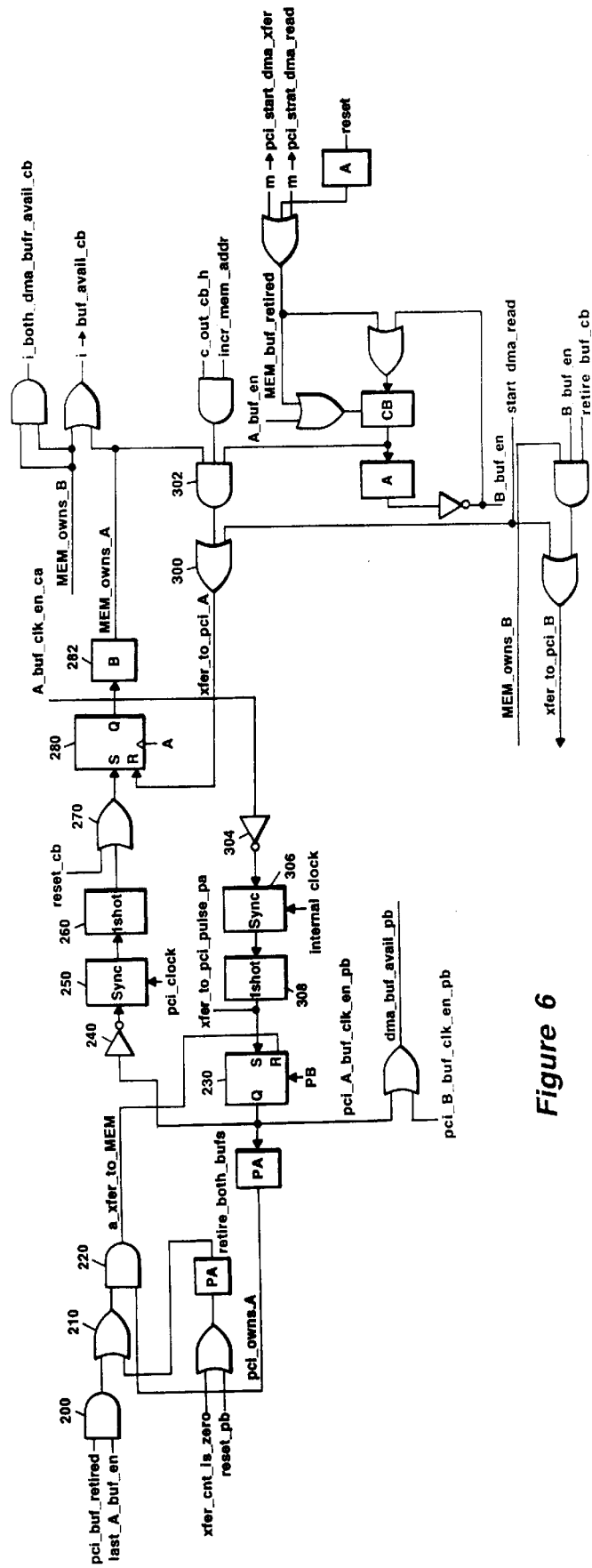
FIG. 6 depicts a schematic diagram of the block diagram of FIG. 5.
Figure 7:
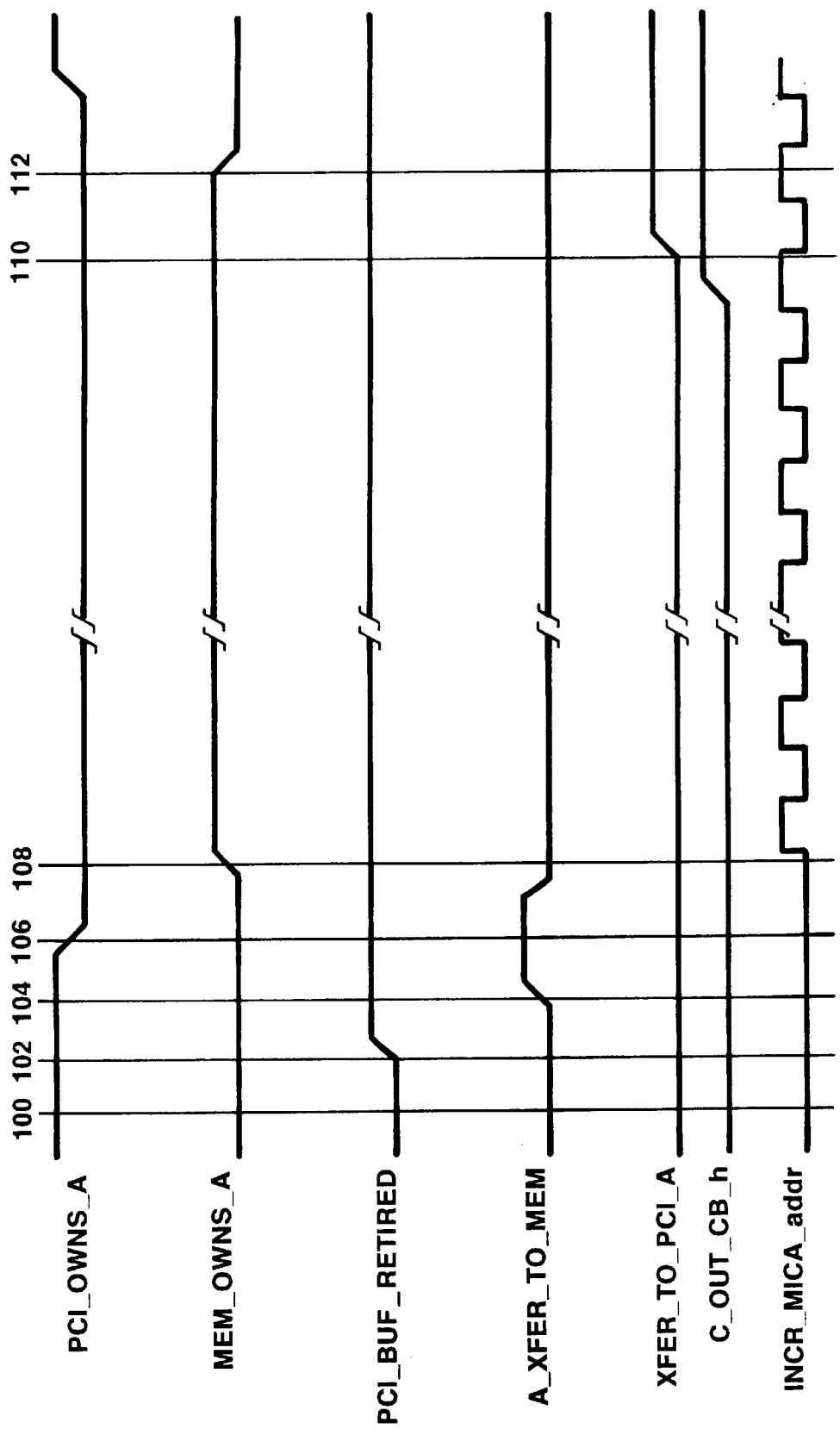
FIG. 7 depicts a timing diagram for the operation of the elements comprising the schematic of FIG. 6.

Referring now to FIG. 6, one embodiment of a circuit for controlling ownership of one double buffer is shown and will be described with reference to FIG. 7. A second circuit (not shown) which is functionally similar to the circuit of FIG. 6 is used to control ownership of the second buffer. A timing diagram is shown in FIG. 7 which depicts a typical transition of ownership of double buffers between memory controller 21 and the PCI controller 19. It should be noted that for illustration purposes, the schematic diagram references each double buffer individually as buffer A and buffer B.

The depicted DMA write operation begins at time 100 with signals PCI_OWNS_A and MEM_OWNS_B(not shown) asserted, and signals MEM_OWNS_A and PCI_OWNS_B(not shown) de-asserted. At time 102, memory controller 21 is finished loading buffer B with data to be transferred to system memory and Controller 19 is finished emptying buffer A to the PCI™ bus. Therefore, at time 102, the device driver subsequently asserts signal PCI_BUF_RETIRED which causes the outputs of gates 200 and 210 to assert. The assertion of the output of gate 210 causes the output of gate 220, referred to as signal A_XFER_TO_MEM, to assert at time 104.

The assertion of A_XFER_TO_MEM resets the output of S-R flop 230 which in turn de-asserts signal PCI_OWNS_A at time 106. The output of S-R flop 230 is inverted by inverter 240 and input to synchronizer 250 which synchronizes it to the PCI™ clock. The synchronized output of 250, passes through one-shot device 260 and gate 270. The output of gate 270 asserts the output of flop 280 which, after passing through buffer 282, becomes signal MEM_OWNS_A at time 108. Thus, at time 108 the memory controller has acquired ownership of buffer A.

The transfer of ownership of buffer A back to the PCI™ controller 19 occurs when memory controller 21 completely fills buffer A. Signal XFER_TO_PCI_A is asserted at time 110 when either input to gate 300 asserts. The inputs to gate 300 are asserted by two data paths. The first data path, referred to as signal START_DMA_READ asserts when a DMA read operation is beginning. The effect of this assertion is to transfer ownership of both buffers to the PCI™ controller because during a read operation, at least one buffer needs to be filled before the memory controller can operate on it. The second data path is comprised of a plurality of signals, beginning with signal A_BUF_EN. Signal A_BUF_EN is one of three inputs to AND gate 302 which is asserted when the memory controller is actively using buffer A. Signals C_OUT_CB_H and INCR_MEM_ADDR are asserted when the address counter indicates that a full buffer has been operated on. When all three signals are asserted, signal XFER_TO_PCI_A is asserted.

The assertion of XFER_TO_PCI_A resets the output of S-R flop 280 which in turn de-asserts signal MEM_OWNS_A at time 112. Signal XFER_TO_PCI_A also passes through inverter 304, synchronizer 306, and one shot device 308 before asserting the set input to S-R flop 230. The output of S-R flop 230 is therefore asserted which in turn asserts signal PCI_OWNS_A. At this point in the cycle, buffer A is again owned by PCI™ controller 19. The cycle will repeat when PCI™ controller 19 empties buffer A.

It should be noted that signal RETIRE_BOTH_BUFFERS only asserts when the circuit is in a reset state or when the entire DMA transaction has completed. Upon assertion of RETIRE_BOTH_BUFFERS, ownership of both double buffers is passed to the memory controller anticipating that the next data transaction will be a DMA write. This is beneficial because at the beginning of a DMA write operation, the memory controller 21 has to fill at least one buffer before the PCI controller 19 can begin a DMA transfer of data.

The double buffering of data between the PCI controller 19 and memory controller 21 has the advantage of sustaining a continuous flow of data from the co-processor 15 to the PCI™ bus 18, as well as from the PCI™ bus 18 to the private memory 22.

In terms of the design of the double buffer in co-processor 15, the duration of time for memory controller 21 to access data and write it into a buffer is designed to be comparable to the time that it takes the PCI™ controller 19 to load the same data onto the PCI™ bus. This access time is complicated by independent operations of the PCI™ bus, such as operations which occur during retry cycles, which significantly extends the duration of the data transfer.

Other complications to loading and unloading data to the double buffers arise when dealing with memory that implements a RAS and CAS addressing methodology. For example, in computer system 10 of FIG. 1, when a memory access crosses a page address boundary, it takes an additional amount of time to access the new page. The CAS access rate of private co-processor memory 22 elements is one quadword per four internal clock cycles. If the access crosses a page boundary, an additional eleven clock cycles are required to access the data which results in an access rate of one quadword per 15 clock cycles. Refresh cycles can also extend data transfer periods. For example, in computer system 10 of FIG. 1, if a refresh cycle is required while Memory controller 21 is performing a DMA transfer, an additional 22 clock cycles are added to the normal cycle time. It should be noted that the number of clock cycles are dependent on the type of memory used and are not limited by these illustrated values.

A further problem that affects access to the double buffers is when the target device de-asserts the target ready (TRDY) signal indicating that it is not ready to receive or transmit data. This has the effect of slowing down the DMA transfer and therefore, the time to fill one buffer may exceed the time to empty the other buffer or vice versa.

Therefore, except under the conditions described above, the double buffer configuration increases the data bandwidth across the PCI™ bus by allowing data to be transferred at a maximum rate based upon smooth data flow between the PCI™ controller 19 and the memory controller 21.

III. Wait Enable

For the reasons stated in the previous section, the conditions causing a delay in the transfer of data also increases the latency of the data transfer which, if greater than 8 wait cycles, requires the bus master to relinquish control of the bus. In addition, the PCI™ protocol requires de-assertion of the FRAME signal prior to the transfer of the last longword of data. The combination of these two protocol elements requires PCI™ controller 19 to determine whether or not it can meet the latency requirement before it transfers the last data element from a double buffer. Therefore the PCI™ controller 19 is required to determine whether it should retain or relinquish control of the bus when the last data element of a buffer is transferred.

When the PCI™ controller 19 relinquishes control of the bus, it is required to re-arbitrate and re-acquire bus ownership before it is capable of transferring further data. Relinquishing and subsequently re-acquiring ownership of the bus significantly increases the duration of the transaction which therefore reduces the overall performance of the device and decreases its bus bandwidth. One solution to this problem is to provide the PCI™ controller 19 with a Wait Enable function.

Figure 8:
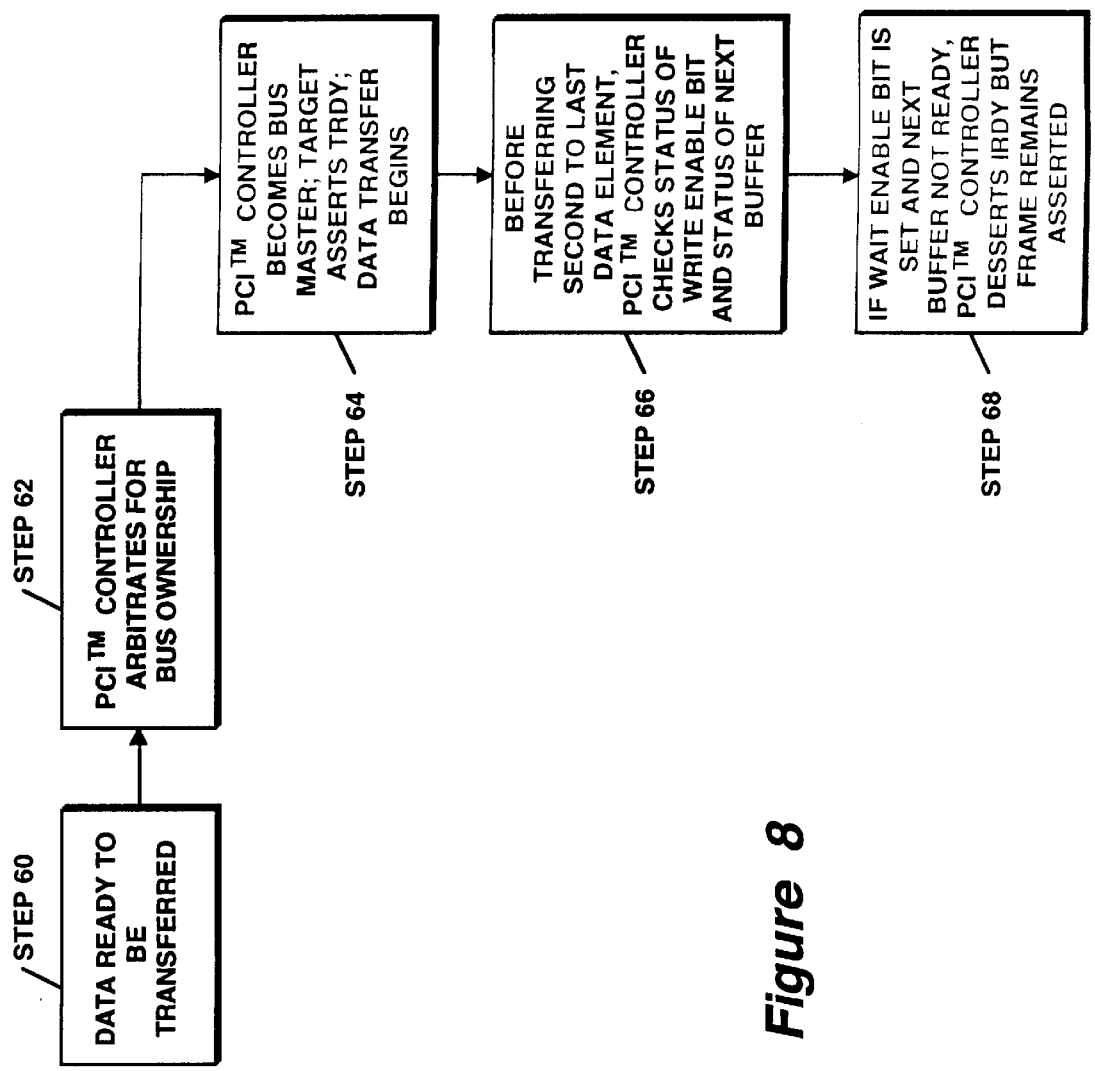
FIG. 8 depicts a flow diagram of the Wait Enable functionality implemented by co-processor 15 of FIG. 2.

Referring now to FIG. 8, a flow diagram illustrating use of the Wait Enable function is shown. When data becomes ready to be DMA transferred (step 60), PCI™ Controller 19 acquires ownership of the PCI™ bus (step 62). Subsequently, a DMA data transfer is initiated (step 64). Ideally, when PCI™ controller 19 transfers the next to last entry in the double buffer it currently has ownership of, for example buffer 26, the memory controller should be ready to relinquish control of its buffer, for example buffer 27. Otherwise, if the memory controller is filling or emptying its buffer at this point it will not be ready to release ownership of the buffer and as a result the transfer will stall. Therefore, prior to transferring the second to last data element, the PCI™ controller 19 checks the status of a Wait Enable control bit (step 66). If the Wait Enable control bit is set, when the PCI™ controller transfers the next to last entry in its double buffer 28 and the next buffer is not ready, signal IRDY is de-asserted and signal FRAME remains asserted (step 68). The de-assertion of IRDY while FRAME remains asserted, generates a Wait cycle on the PCI™ bus which allows the co-processor to retain ownership of the PCI™ bus although no data is immediately being transferred.

Typically a bus master can issue only a limited number of wait cycles (less than eight) before it is required to relinquish bus ownership. If the buffer being emptied or filled by the memory controller becomes available for ownership by PCI™ Controller 19 within a five wait cycle time period, co-processor 15 reasserts signal IRDY, transfers the last longword of the buffer, and the DMA transaction continues to execute using the next buffer. However, if the next buffer is not available before the five PCI™ clock cycle time period elapses, co-processor 15 relinquishes the bus and subsequently re-arbitrates to finish its DMA transaction.

Thus the Wait Enable function allows co-processor 15 to lock its internal resources, specifically those resources within the memory controller 21 and the PCI™ controller 19 that are required to continue the DMA transaction, to the DMA data transfer task. Such locking of resources results in maximization of PCI™ bus usage and bandwidth for co-processor 15.

IV. Backup Register

For DMA writes, when the PCI™ unit attempts to transfer the last longword of a DMA buffer, it is possible that the target of the transfer will de-assert the TRDY signal, thereby not accepting the transfer. The design of co-processor 15 implements a back-up register which is loaded during each PCI™ bus data phase with the longword that is being written to the PCI™ bus.

Figure 9:
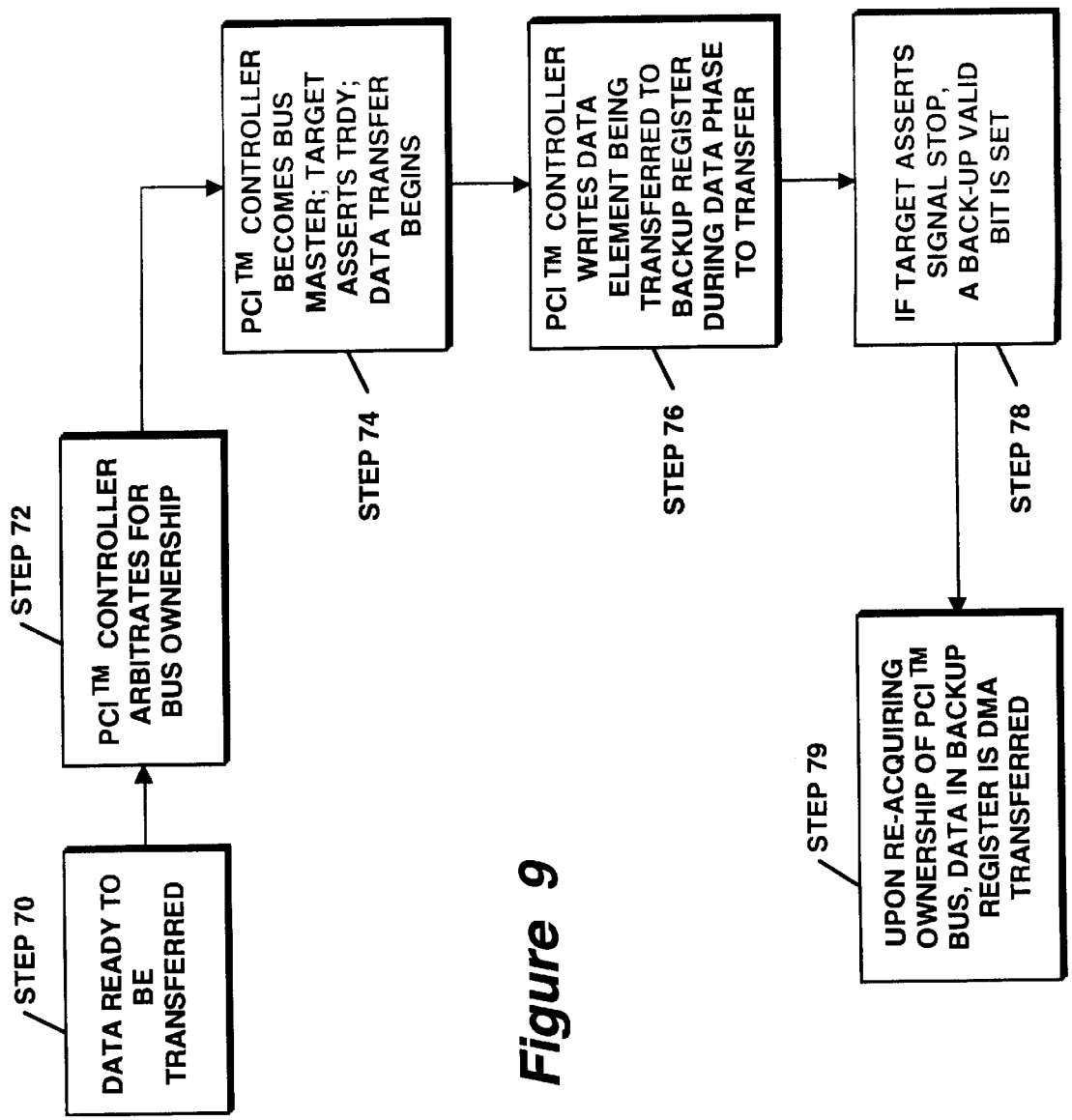
FIG. 9 depicts a flow diagram of the Backup Register operation as implemented in co-processor 15 of FIG. 2.

Referring now to FIG. 9, a flow diagram illustrating use of the Backup Register is shown. When data becomes ready to be DMA transferred (step 70), PCI™ Controller 19 acquires ownership of the PCI™ bus (step 72) and begins the DMA operation (step 74). During the data phase of the DMA transfer, i.e. the time that a data element is placed on the PCI™ bus, it is also written to the Backup Register for temporary storage (step 76). If the target device asserts the STOP signal, indicating that the bus master should terminate the cycle on the last assertion of IRDY in the data transfer, then a bit indicating "back-up valid" is set (step 78).

When PCI controller 19 re-acquires ownership of the PCI bus, if the back-up valid bit is set, the first longword transmitted is sourced from the back-up register and not from the current address of the DMA buffer (step 79). This back-up mechanism therefore allows the PCI controller 19 to return the DMA buffer to the memory controller 21 for immediate use. Since the back-up register always holds the last data item, the buffer is no longer required after the last longword of data is read out.

V. Memory Gather/Scatter Mapping for Non-contiguous Physical Memory DMA

Co-processors typically perform DMA transfers of data only into storage areas having pre-defined and fixed address space. However, through the use of Gather/Scatter tables stored in private co-processor memory 22, co-processor 15 writes directly to a virtual memory address space that the application indicates.

During the processing of video data, the software driver reserves areas of physical memory to store processed data. Since this data will need to be accessed to either display it or to process it further, and since application programs typically use virtual addresses, a mapping from virtual address to physical address is necessary. Co-processor 15 uses a Gather/Scatter map to read and write physical memory corresponding to the virtual memory accessed by the CPU.

Using a programmed I/O write operation, the driver code updates the Gather/Scatter map before the corresponding DMA operation takes place. When a DMA data transfer is executed, it uses the physical addresses stored in the Scatter/Gather map.

VI. Scheduling of DMA Operations

Figure 10:
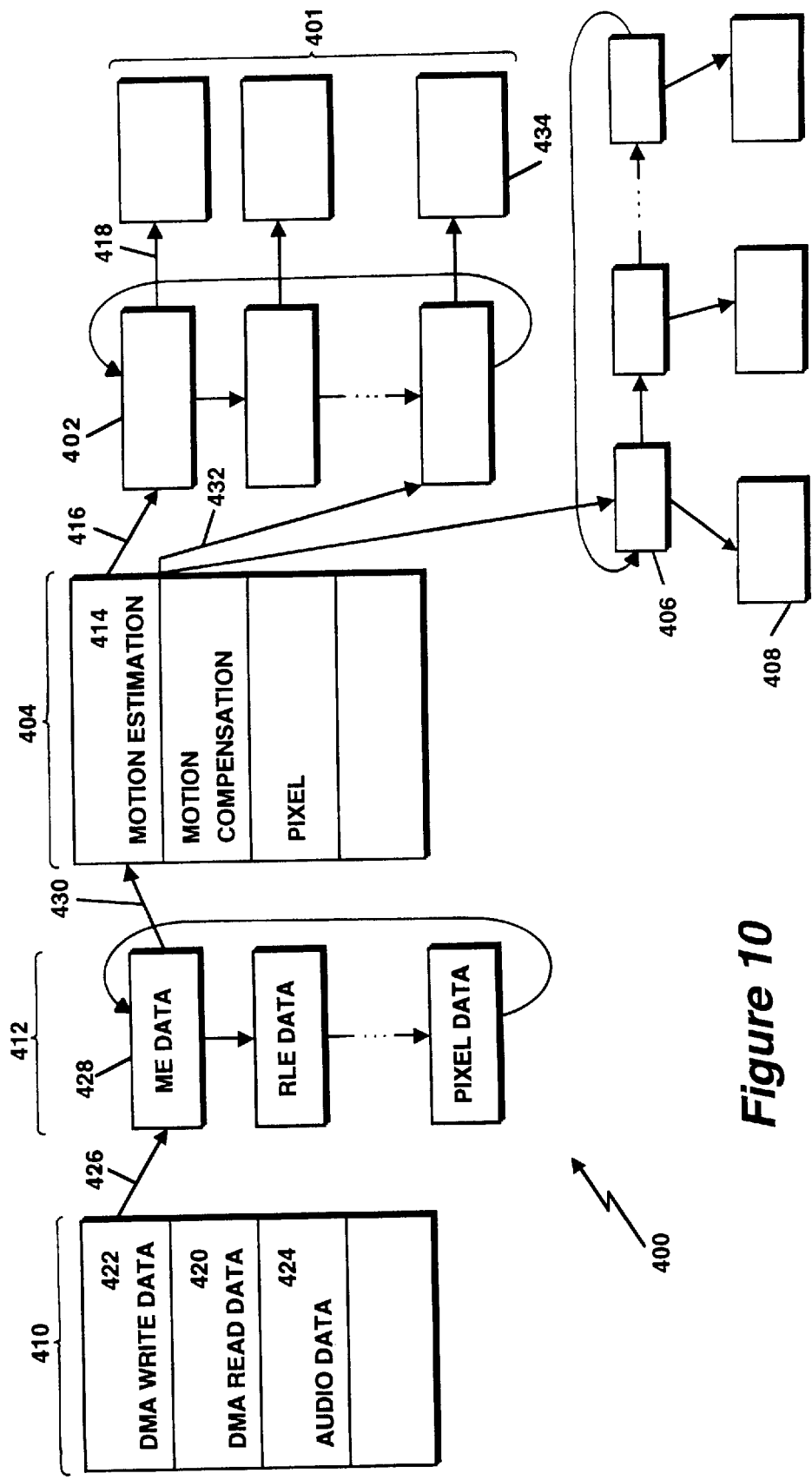
FIG. 10 depicts a block diagram of the interaction between the control structures used by the co-processor of FIG. 1.

Referring to FIG. 10, Co-processor 15 contains a plurality of control structures 400 that support the transfer of different types of DMA data using a common memory controller microcode flow. A block diagram is provided for illustrating the interaction between these control structures.

The block diagram comprises a plurality of DMA data storage buffers 401 for storing data to be DMA transferred, a circular linked list 402 associated with each type of data used by co-processor 15 comprising pointers to each of the data buffers 401, and a channel descriptor array 404 comprising pointers to each of the circular linked lists 402, and pointers to another circularly linked list 406. Circularly linked list 406 comprises pointers to a plurality of Gather/Scatter tables 408 for mapping virtual addresses to physical addresses. The control structures 400 further include a schedule FIFO array 410 comprising pointers to a third plurality of circularly linked lists 412. Each of the third plurality of circularly linked lists 412 is referred to as a schedule fifo and comprises pointers back to locations in the Channel Descriptor Array 404.

For illustration purposes, consider that a particular video frame being operated on performs the transfer to system memory 14 of one packet of motion estimation data, followed by a packet of RLE data, followed by a packet of pixel data. When the first packet of motion estimation data is ready to be transferred to system memory 14, the Channel Descriptor Array element for motion estimation data 414 is accessed. The Channel Descriptor Array element for motion estimation data 414 contains a pointer 416 to the tail of the first circular linked list 402 which provides a pointer 418 into the DMA data storage buffers 401 where the data is stored.

When the data is required by co-processor 15, the device driver accesses the Schedule FIFO Array 410 which comprises elements referring to DMA read data transfers 420, DMA write data transfers 422, and audio data transfers 424. Since the required data is DMA write data, element 422 is accessed to provide a pointer 426 to the location of the Write Schedule Fifo circular linked list 412. The first data that is requested is Motion Estimation data. Therefore, the accessed Write Schedule Fifo element 428 comprises a pointer 430 to the location in the Channel Descriptor Array 404 of the Motion Estimation element 414. The Motion Estimation element 414 provides an unload pointer 432 to circular linked list 402 which points to the DMA data storage buffer 434 containing the Motion Estimation data that was previously stored. The required data is then accessed by the co-processor device. The same steps are repeated for the RLE and Pixel data but with the pointers pointing to the appropriate locations for these types of data.

The control structures shown in FIG. 10 allow for the operation of a DMA data transfer method for multiple channels of data, each having different data lengths and characteristics, using a single program flow. It also has the benefit of allowing multiple Gather/Scatter tables, such as 408, to be set up for a single data channel via the circular linked list 406. Therefore, when co-processor 15 is executing DMA transfers, the software driver can set up page tables for future DMA operations to reduce the overhead of DMA operations and thereby increase performance.

While the specified control structure successfully reduces data bandwidth for a single bus master device, the cumulative effect of data transfers across the PCI™ bus should also be considered. It is well known in the industry that transferring a plurality of smaller packets of data from a device provides time slices for other devices to acquire ownership of the bus.

The advantages of transferring small packets are particularly relevant to data that is latency critical. For example, in the computer system of FIG. 1 audio data is more latency critical than other channels of data used by co-processor 15. Audio data is extremely latency critical because any delay in transfer will cause corruption of voice or sound characteristics when the video and audio data are displayed. Such corruption of audio data typically manifests itself in perceived pauses between sounds which are detectable by the user of the system. Therefore it is unacceptable for a system to allow latency critical audio data to be preempted by less critical data which is in the process of a long DMA transfer.

DMA transfer of small packets of data allows a system to avoid problems similar to those mentioned above for audio data. In the present invention, reduction of data packet size is performed by reducing the size of data buffers 400 and by reducing the granularity of data referenced by each element of each-Schedule FIFO Array 412.

VII. Minimization of PIO Writes

Programmed I/O writes are used by CPU 12 to set up and deposit data into the control structures described above. An aspect of the present invention allows programmed I/O writes to be minimized through a method for re-using page table entries.

A page table is a list of physical page addresses that correspond to each virtual memory page. When a memory address is requested by the co-processor unit, the page table entry associated with the requested address is accessed to generate the physical address of the data. A Gather/Scatter table 408, as depicted in FIG. 10, is such a page table.

Significant system resources are required to keep the Gather/Scatter tables valid, since updates are performed using PIO read and write operations. For example, in co-processor 15 each page table entry comprising a Gather/Scatter table is subdivided into four entries. One entry is the system memory address of the memory page of interest, another is the number of quadwords on that page, a third is comprised of transfer qualifiers relating to the data transfer, and a fourth is unused. Since each page table entry is updated through the use of a PIO write, each page of a DMA transfer represents four PIO writes. Accordingly, since a typical DMA transfer of pixel data maps into approximately forty pages of physical memory, each of which is represented by a page table entry, a forty page DMA transfer results in one hundred and sixty PIO writes. While a DMA transfer of pixel data is used in the given example, this calculation applies to all types of data transferred by co-processor 15. Therefore, since a typical frame constitutes approximately ten DMA transfers, the system will perform approximately 1600 PIO writes during a single frame processing time period.

Referring again to FIG. 10, in order to reduce the number of PIO writes and hence reduce the amount of system overhead required, a further aspect of the present invention is to re-use formerly allocated Gather/Scatter table entries. Since the Gather/Scatter tables are stored in private co-processor memory 22, the driver merely adjusts the relevant pointer contained in the related circular linked list 406 to point to the appropriate re-usable page table, when the entries are ready to be re-used. Such a software adjustment saves the substantial system overhead associated with 160 PIO writes by eliminating the step of allocating new Gather/Scatter tables in memory.

Similarly if the write schedule fifo elements are each pre-written into private co-processor memory 22, the same reduction can be realized upon subsequent re-use of these same elements. Therefore, upon implementation of the present method for re-using page table entries, the system of FIG. 1 can reduce the required number of PIO writes to approximately 20 or less per frame. Using these 20 PIO writes, co-processor 15 can sustain itself independently from the CPU for approximately 2.2 million cycles. Accordingly, with minimal overhead the co-processor device 15 receives a high degree of autonomy from the CPU which increases the performance of the device and of the overall system.

VIII. DMA Read Semaphore

During DMA write operations, Co-processor 15 generates write data to be transferred to system memory and therefore has the capacity to schedule when DMA write transfers take place. However, during DMA read operations the target device supplies the data to be transferred, rather than co-processor 15, and therefore these operations are more difficult to schedule. Thus, an aspect of the present invention facilitates scheduling of DMA read data transfers through the use of a DMA read semaphore.

Figure 11:
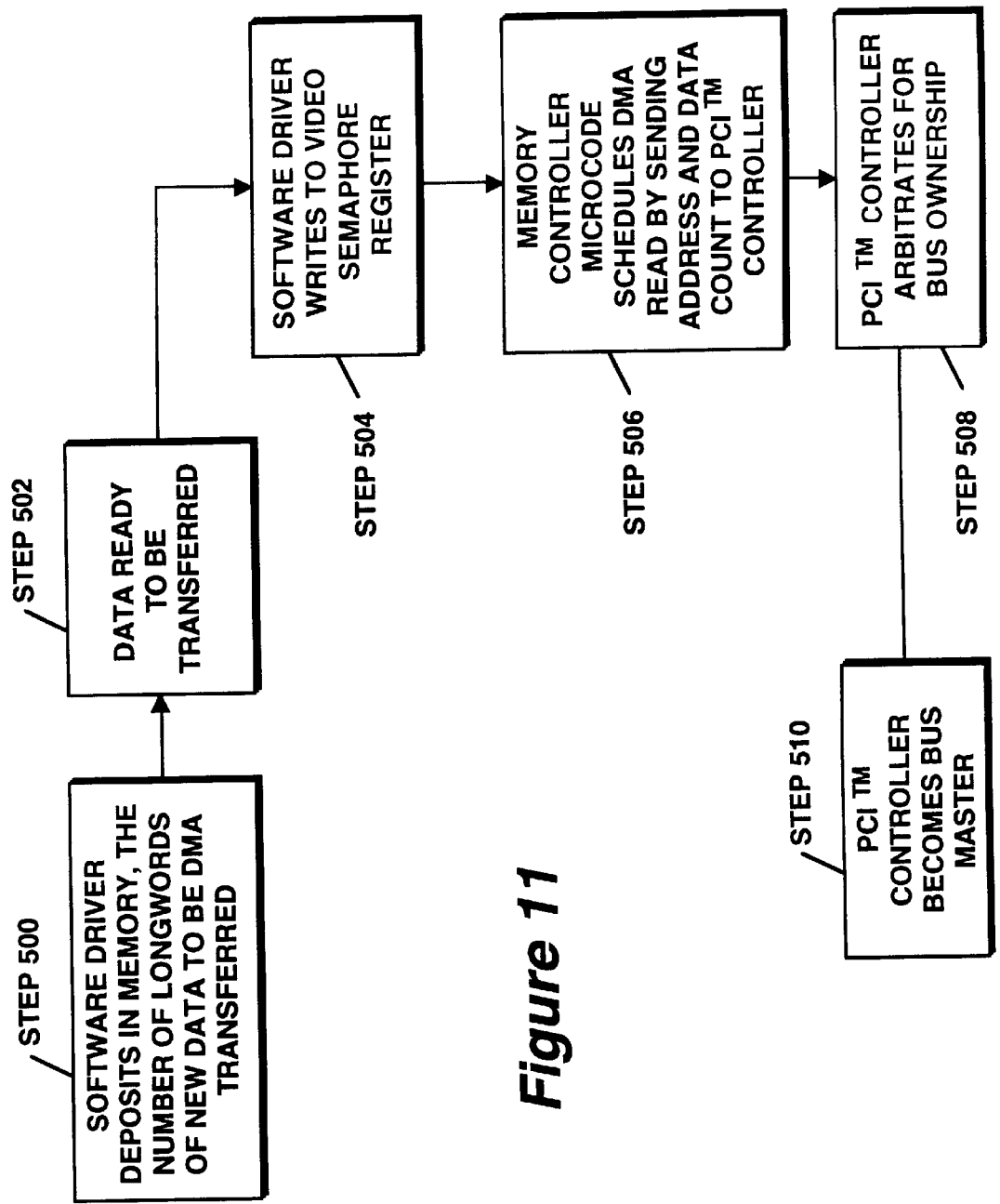
FIG. 11 depicts a flow diagram of the DMA Read Semaphore operation as implemented in co-processor 15 of FIG. 2.

Referring to FIG. 11, when co-processor 15 is performing a DMA data transfer, a DMA read semaphore is used by Central Processor Unit 12 to inform it that further data is ready to be transferred. Such a DMA read semaphore is initialized when the co-processor's driver software deposits the number of longwords to be transferred to a location in private co-processor memory 22 (step 500). When data is ready to be transferred (step 502) the driver software writes to a register, referred to as the video semaphore register, which causes an interrupt to be generated in the memory controller 21 (step 504). The interrupt indicates to the memory controller 21 that there is DMA read data available to be DMA transferred.

The value written to the video semaphore register is protected from corruption because the driver cannot subsequently write to the video semaphore register until memory controller 21 acknowledges the assertion of the interrupt. Accordingly, memory controller 12 is able to maintain an accurate list of pending DMA read transfers which will be serviced in the order that the associated interrupts are received.

When memory controller 12 begins to service a pending DMA read transfer, its microcode schedules the transaction by sending the address to be accessed and a count of the number of data elements to be read, to PCI™ Controller 19 (step 506). Subsequently, PCI™ Controller 19 arbitrates to acquire ownership of the bus (step 508) and, upon becoming bus master (step 510), initiates the actual DMA read data transfer.

IX. High and Low Water Thresholds

Typically, DNA data transfers are initiated as necessary by the memory controller 21. However, if a backlog of data to be transferred to system memory is generated, Co-processor 15 has the capability to give the data transfers the highest priority of scheduled operations for the purpose of shipping the data out quickly and clearing the backlog.

To determine if a backlog is forming, by monitoring the amount of data waiting to be transferred, Co-processor 15 maintains a count of the number of DMA packets that are ready to be transferred to system memory. If the count rises above a pre-defined high water threshold, indicating an imminent backlog condition, the co-processor device sets an interrupt priority bit in the memory controller microcode.

As described in FIG. 2, Co-processor 15 comprises a Slot machine unit 23 which is a microsequencer device that coordinates the activities of the memory controller 21 and the FMU 20. Slot machine 23 synchronizes the retrieval of data from private co-processor memory 22 with the data manipulation needs of FMU 20. When slot machine 23 is synchronizing data transfers between these devices, it cannot execute the next instruction in its program flow until the memory controller unit 21 and the FMU 20 both signal that their respective data activities are complete. Accordingly, to make these operations as efficient as possible, the Slot machine microcode attempts to balance the execution times of both dispatches (to the FMU and the Memory controller) such that they complete at approximately the same time.

The condition sometimes occurs where the Memory Controller finishes its activity before the FMU does. When this condition arises, the memory controller uses the otherwise wasted clock cycles to support DMA data accesses. On the other hand, when the FMU activities takes shorter than Memory controller activities, time is not normally available to support DMA data accesses. When the FMU 20 and Memory controller 21 complete their respective activities, slot machine 23 is free to execute the next instruction in its program flow, and data processing continues.

However, when the interrupt priority bit in the memory controller microcode is set, it commands the memory controller not to wait for a period of time when the FMU is busy to perform DMA transfers. Rather, when this bit is set, the memory controller is required to execute pending DMA transfers as soon as possible to reduce the number of data packets waiting to be transferred. When the count is reduced below a pre-defined low water threshold, the interrupt priority bit is returned to the normal operating value and operation continues as described above.

X. Valid Bits

As previously specified, during compression and decompression operations, the memory controller 21 is storing and retrieving data to/from the private co-processor memory 22 for the FMU 20. Simultaneously memory controller 21, under interrupt control, is also storing and retrieving data from DMA data transfer operations. Because of these simultaneous storage operations, it is possible that the FMU could attempt to access a packet of data that has not been completely DMA transferred into memory 22.

To prevent this problem from occurring, co-processor 15 sets a valid bit as soon as it completes a DMA read cycle. Accordingly, Co-processor 15 will not begin encoding any video data until the Valid bit associated with its data packet is set. Therefore, this mechanism synchronizes the compression operation and the DMA data transfer operation so that no operation will begin until all the required data has been retrieved into memory 22 and is ready to be used.

A further optimization concerning the Valid bit applies when co-processor 15 performs DMA write operations for RLE channel data. The amount of buffering required for an RLE compressed frame is variable. Therefore, when operating on RLE data the driver program allocates a sufficient number of buffers to accommodate the theoretical maximum limit of the variable length RLE data.

The private co-processor memory 22 has a size which is typically 2 megabytes. The cost for 2 megabytes of DRAM is approximately equivalent in price to the price of the co-processor device itself. Because the goal of a successful co-processor design is to be low cost, any increase in the size of memory will constitute a significant increase in the cost of the design. To this end, it is expensive to dedicate a large buffer to accommodate RLE data if the buffer will typically never be fully used. Therefore, co-processor 15 implements the valid bit concept to assist in accommodating RLE data buffers.

Co-processor 15 allocates a plurality of buffers having a storage capacity that is less than the absolute maximum possible data size for storage of RLE data. As each RLE data buffer is filled, the device driver simultaneously sets its valid bit. Accordingly, when the data is transferred out of the RLE data buffer, the valid bit is cleared. The result of this method is that the RLE data buffers can be re-used, thus significantly reducing the required number of data buffers to be allocated. Thus, only when all the re-usable buffers are full of RLE data with valid bits set will the device have to wait for a free buffer.

As described above, many problems can arise when transferring data in a PCI™ environment. Accordingly the methods specified herein, implemented individually or in concert with others, solve these problems by providing mechanisms for optimizing data transfer rates of high bandwidth DMA transfers over a PCI™ bus.

Having described a preferred embodiment of the invention, it will now become apparent to one of ordinary skill in the art that other embodiments incorporating its concepts may be used. It is felt, therefore, that this embodiment should not be limited to the disclosed embodiment, but rather should be limited only by the spirit and scope of the appended claims.

What is claimed is:

1. A co-processor device having capability to transfer data over a data bus wherein said co-processor comprises:
   a first circuit portion for acquiring ownership of said data bus and for controlling data transfers over said data bus;
   a second circuit portion for controlling a memory system and for transferring data from said memory system to said first circuit portion to be transferred over said data bus; and
   a double buffer configuration for connecting said first circuit portion and said second circuit portion, said double buffer having a first data storage buffer and a second data storage buffer wherein each of said data storage buffers can be read from or written to independently and wherein a data element stored in a one of said data storage buffers is transferred between said first circuit portion and said second circuit portion without being transferred to an other one of said data storage buffers.

2. The co-processor of claim 1 wherein each of said first and second data storage buffers comprising a plurality of data storage locations, and each of said first and second data storage buffers having the capability of being accessed by said first circuit portion and by said second circuit portion.

3. The co-processor of claim 2 wherein said co-processor further comprises:
   a first control circuit for determining which of said first data storage buffer and said second data storage buffer is accessed by said first circuit portion; and
   a second control circuit for determining which of said first data storage buffer and said second data storage buffer is accessed by said second circuit portion.

4. An apparatus for controlling first data transfer over a data bus which comprises:
   a first device acquiring ownership of said data bus and initiating a first data transfer between said first device and a second device wherein said first device comprises:
      a first plurality of storage locations each comprising a first software pointer to one of a second plurality of storage locations for storing data to be transferred to said second device;
      a third plurality of storage locations each corresponding to a class of data and each comprising a second software pointer for loading data into one of said first plurality of storage locations, each of said third plurality of storage locations further comprising a third software pointer for reading data out of one of said first plurality of storage locations, said third storage location further comprising a fourth software pointer for pointing to a fourth plurality of storage locations, each of said fourth plurality of storage locations comprising a fifth software pointer to one of a fifth plurality of storage locations;

a sixth plurality of storage locations each storage location corresponding to a class of data operation and each of said sixth plurality of storage locations comprising a software pointer to one of a seventh plurality of storage locations, each of said seventh plurality of storage locations comprising a pointer to one of said third plurality of storage locations.

5. The apparatus of claim 4 wherein said first plurality of storage locations, said fourth plurality of storage locations, and said seventh plurality of storage locations are circular linked lists.

6. The apparatus of claim 5 wherein said fifth storage location stores a mapping of virtual memory pages to physical memory addresses.

7. The apparatus of claim 5 wherein said fifth software pointer is adjustable for pointing to one of an eighth plurality of storage locations associated with a second data transfer.

* * * * *